United States Patent  
Tsuda et al.

(10) Patent No.: US 7,486,483 B2  
(45) Date of Patent: Feb. 3, 2009

(54) ROTATING DISK STORAGE DEVICE WITH IMPROVED ACTUATOR ARM

(75) Inventors: Shingo Tsuda, Kanagawa (JP); Takaaki Deguchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 366 days.

(21) Appl. No.: 11/136,942

(22) Filed: May 24, 2005

(65) Prior Publication Data
US 2005/0264942 A1  Dec. 1, 2005

(30) Foreign Application Priority Data
May 26, 2004  (JP) ............... 2004-156407

(51) Int. Cl.  
*G11B 17/00*  (2006.01)

(52) U.S. Cl. .................................. 360/265.7

(58) Field of Classification Search .............. None  
See application file for complete search history.

(56) References Cited

U.S. PATENT DOCUMENTS

| | | | | |
|---|---|---|---|---|
| 5,654,849 A | * | 8/1997 | Hassibi et al. | 360/98.07 |
| 6,018,441 A | * | 1/2000 | Wu et al. | 360/265.6 |
| 6,636,383 B1 | * | 10/2003 | Chew | 360/245.9 |
| 6,836,387 B2 | * | 12/2004 | Ohba et al. | 360/97.01 |
| 6,856,485 B2 | * | 2/2005 | Toh et al. | 360/99.08 |
| 6,982,853 B1 | * | 1/2006 | Oveyssi et al. | 360/265.9 |
| 7,215,513 B1 | * | 5/2007 | Chang et al. | 360/265.9 |
| 2002/0196587 A1 | | 12/2002 | Nakasuka et al. | |
| 2004/0246627 A1 | * | 12/2004 | Durrum et al. | 360/265.6 |
| 2004/0264060 A1 | * | 12/2004 | MacPherson | 360/265.7 |

FOREIGN PATENT DOCUMENTS

| | | |
|---|---|---|
| JP | 03 035482 A | 2/1991 |
| JP | 03035482 | 2/1991 |
| WO | WO 99/65022 A2 | 12/1999 |

* cited by examiner

*Primary Examiner*—Mark Blouin  
(74) *Attorney, Agent, or Firm*—Townsend and Townsend and Crew LLP; John Henkhaus

(57) ABSTRACT

Embodiments of the invention establish electric continuity across an actuator head suspension assembly and a pivot bearing assembly without involving an increased manufacturing cost through a simple structure. In one embodiment, a carriage made of a plastic resin is provided with a pivot opening. A pivot bearing assembly is inserted into the pivot opening. The pivot opening includes a step formed by holes having different hole diameters from each other at an adjoining portion thereof. Two actuator arms are secured to the carriage through insert molding to support an HDA. One of the two actuator arms is provided with a hole functioning as a pivot opening and having a smaller hole diameter so as to form the step. The other of the two actuator arms is provided with a hole functioning as a pivot opening and having a larger hole diameter. The hole having the larger hole diameter includes protruded portions that abut against the pivot bearing assembly with no clearance therebetween. The hole also includes recessed portions disposed between each adjoining pair of the protruded portions and having a clearance from the pivot bearing assembly.

17 Claims, 4 Drawing Sheets

(a)

(b)

(a)

(b)

ROTATING DISK STORAGE DEVICE WITH IMPROVED ACTUATOR ARM

CROSS-REFERENCES TO RELATED APPLICATIONS

This application claims priority from Japanese Patent Application No. JP2004-156407, filed May 26, 2004, the entire disclosure of which is incorporated herein by reference.

BACKGROUND OF THE INVENTION

The present invention relates generally to a rotating disk storage device and, more particularly, to a rotating disk storage device having an improved actuator arm that is secured through insert molding to a carriage made of a plastic resin.

A magnetic disk drive, as one of applied examples of the rotating disk storage device, generally includes a head disk assembly (hereinafter referred to, in this specification, as an HDA) and a printed circuit board mounted thereon. The HDA is an enclosed structure of a disk enclosure for accommodating in a clean air environment a magnetic disk, an actuator head suspension assembly (hereinafter referred to, in this specification, as an AHSA), a spindle motor, electronic components, and the like. The printed circuit board is mounted with electronic components for controlling operations of the magnetic disk drive and transfer of data.

The AHSA is mounted with a slider, to which a magnetic head for reading and writing data is mounted and which provides an air bearing surface. The AHSA includes an actuator assembly having a carriage arm that pivotally moves about a pivot.

A coil support is formed in part of the carriage arm. The carriage arm holds a voice coil. The coil support is disposed in a magnetic field of a voice coil magnet. The voice coil magnet and the voice coil form a voice coil motor (hereinafter referred to, in this specification, as a VCM) that generates a driving force for pivotally moving the carriage arm.

When the magnetic disk spins, a surface air flow gives the air bearing surface of the slider a lifting force, causing the slider to fly just above the magnetic disk surface. The driving force of the VCM causes the slider to pivotally move about the pivot substantially radially relative to the magnetic disk. While pivotally moving, the slider maintains a position slightly above the magnetic disk surface. The slider thus allows the magnetic head to position at a desired radial location on the disk surface for reading/writing data.

The AHSA of the magnetic disk drive must be capable of accurately controlling positioning of the magnetic head that reads data from and writes data onto the magnetic disk. To achieve this purpose, a pivot bearing assembly that pivotally moves accurately about the pivot is inserted in a pivot opening in the carriage arm.

The carriage arm generally includes the following components. The components are specifically the pivot opening having a fastening function relative to the pivot; an actuator arm having a support function relative to a head suspension assembly (hereinafter referred to, in this specification, as an HSA) mounted with the slider; a mounting surface having a fastening function relative to a flexible cable; and the coil support having a holding function relative to the voice coil. Two actuator arms may, for example, be provided one for the upper and the other for the lower. The two actuator arms are press-fitted into a spacer and insert-molded in a plastic resin with the voice coil. The carriage arm is therefore an assembly including five components of two metal actuator arms, one metal spacer, one voice coil, and one plastic resin carriage.

Improvements are being made to achieve cost reduction by implementing a simple structure and reducing the number of components for the carriage arm that includes the five components to serve the four different functions, while allowing each of these components to perform its intended function.

For example, a first carriage arm is proposed. The first carriage arm is a unitized body that includes five different components of two actuator arms, one spacer, one voice coil, and one carriage. This arrangement is achieved by integrating the carriage with the actuator arms by forming the two actuator arms with a plastic resin.

A second carriage arm is proposed. The second carriage arm is a unitized body including three different components. A metal is formed into a predetermined cross-sectional shape through extrusion molding to make actuator arms and spacer. The extrusion-molded metal is then subjected to a cutting process for cutting each of the two actuator arms to a predetermined thickness. Electric continuity is then established between the actuator arms and the pivot bearing assembly.

Also proposed is a head moving device, in which the number of components used in the carriage arm is reduced to achieve cost reduction (see, for example, Japanese Patent Laid-open No. Hei 03-35482). In this head moving device, two actuator arms are connected together and the connection between the two actuator arms is folded so that the two actuator arms oppose each other to form a single component.

BRIEF SUMMARY OF THE INVENTION

According to the first carriage arm as described in the related art, the actuator arms are made of a plastic resin. It is, therefore, not possible to use an existing method as the method for fastening the HSA to leading ends of the actuator arms. That is, it is necessary that a new fastening method be devised. No electric continuity can be obtained between the actuator arms and the pivot bearing assembly. The existing fastening method thus causes static electricity to be generated at the leading end of the HSA. If no electric continuity can be obtained across this circuit, the AHSA tends to be charged during manufacturing. As a result, the head could be destroyed by static electricity or a potential difference could be produced between the HSA head or actuator arm and the pivot bearing assembly.

The second carriage arm as described in the related art involves combined processes of extrusion molding and cutting operations, in which an extrusion-molded piece undergoes a separate cutting process. Therefore, cost reduction is not feasible.

An idea is also possible to apply insert molding to the head moving device disclosed in Japanese Patent Laid-open No. Hei 03-35482. While adopting this idea, a plastic resin is used for the carriage of the carriage arm. This arrangement allows the carriage arm to be formed to include three components of one actuator arm, one voice coil, and one carriage.

This approach helps reduce the number of components to make up the carriage arm. In the insert molding used in this approach, however, a clearance is likely to be produced between a hole that forms the pivot opening in the actuator arm and a mold for an insert pin for plugging up this hole in the actuator arm. The clearance is attributable to an error produced during machining the hole in the actuator arm and the mold insert pin. Thin molding flash may at times be produced in the portion of the hole in the actuator arm in the carriage arm pivot opening. The flash is formed by molten resin sneaking into the clearance. If a magnetic disk drive is assembled using a carriage arm, to which the flash is left sticking, the flash scatters in the HDA and a high level of cleanness can no longer be maintained. In addition, the flash may be wedged in a space between the hole in the actuator arm and the pivot bearing assembly, cutting off electric continuity across the circuit. Furthermore, the approach involves another drawback that use of a positioning jig is mandatory to achieve high positioning accuracy in order to position such a carriage arm in a height direction relative to the pivot.

It is therefore a feature of the present invention to provide a rotating disk storage device that allows a clean air environment to be achieved in the HDA, while establishing electric continuity between the AHSA and the pivot bearing assembly without involving an increased manufacturing cost through the use of a simple structure.

It is another feature of the present invention to provide a rotating disk storage device that allows the AHSA and a rotating disk recording medium to be accurately positioned relative to each other without using any positioning jig, while establishing electric continuity between the AHSA and the pivot bearing assembly without involving an increased manufacturing cost through the use of a simple structure.

A rotating disk storage device according to a first embodiment of the present invention includes a rotating disk recording medium, a head suspension assembly, an actuator arm, and a carriage. The head suspension assembly is mounted with a head that reads data from the rotating disk recording medium. The head suspension assembly is secured to the actuator arm. The actuator arm includes a pivot opening, into which a pivot bearing assembly is inserted. A plurality of protruded portions that abut on the pivot bearing assembly are provided on an inner surface of the pivot opening. The actuator arm is made of a conductive material. The carriage includes a pivot opening and is made of a plastic resin. The carriage secures the actuator arm through insert molding.

The first embodiment of the present invention has the following distinctive arrangement for securing the actuator arm in the carriage. Specifically, an insert molding plastic mold includes an insert pin for inserting the actuator arm in the pivot opening. This insert pin is formed to have substantially the same outside diameter as the pivot bearing assembly does. When the actuator arm is insert-molded using this plastic mold, the protruded portions provided on the inner surface of the pivot opening in the actuator arm abut on the insert pin of the plastic mold with no clearance therebetween. Recessed portions are disposed within the mold to have a clearance from the insert pin. The pivot opening in the actuator arm placed inside the mold as described above has not conventionally been free from the following problem. The problem is specifically a clearance from the insert pin produced due to a machining error or other factor in an arrangement, in which the opening abuts on the insert pin of the mold throughout an entire periphery thereof. In accordance with the first embodiment of the present invention, the protruded portions are spaced by recessed portions. The clearance produced by the recessed portions allows the position of the actuator arm relative to the insert pin of the mold to be adjusted. This allows the protruded portions to be abutted evenly against the insert pin of the mold. If insert molding is performed in the condition as noted above, the protruded portions of the pivot opening in the actuator arm abut on the insert pin of the mold with no clearance therebetween. This prevents molten resin from sneaking into the clearance otherwise produced. The recessed portions, on the other hand, have a clearance relative to the insert pin of the mold. The pivot opening is, therefore, formed in these recessed portions with the plastic resin. This eliminates flash otherwise left on the pivot opening in the carriage. A clean air environment can therefore be maintained in the HDA. When the pivot bearing assembly is inserted into the pivot opening, the protruded portions of the pivot opening in the actuator arm can be brought into abutment against the pivot bearing assembly. This establishes electric continuity across the conductive actuator arm and the pivot bearing assembly. In addition, the pivot opening is formed with the plastic resin at positions corresponding to the recessed portions of the actuator arm. It is therefore possible to make the pivot bearing assembly abut against the pivot opening with no clearance therebetween.

A rotating disk storage device according to a second embodiment of the present invention includes a rotating disk recording medium, a first head suspension assembly, a second head suspension assembly, a first actuator arm, a second actuator arm, and a carriage. Each of the first head suspension assembly and the second head suspension assembly is mounted with a head that reads data from the rotating disk recording medium. The first head suspension assembly is secured to the first actuator arm. The first actuator arm includes a pivot opening having a first hole diameter, into which a pivot bearing assembly is inserted. The first actuator arm is made of a conductive material. The second actuator arm is connected to the first actuator arm. The second head suspension assembly is secured to the second actuator arm. Further, the second actuator arm includes a pivot opening, into which the pivot bearing assembly is inserted and which has a second hole diameter that is smaller than the first hole diameter. The second actuator arm is also made of a conductive material. The first actuator arm and the second actuator arm are secured to the carriage. The carriage includes a pivot opening having a first hole diameter and a second hole diameter.

The second embodiment of the present invention has the following distinctive arrangement. Specifically, the pivot bearing assembly can be brought into abutment against a step formed in the pivot opening. This establishes electric continuity across the pivot bearing assembly and the second actuator arm. Since the second actuator arm is connected to the first actuator arm, electric continuity can be established across these two actuator arms. The step is formed at an adjoining portion between the first hole diameter and the second hole diameter which is smaller than the first hole diameter in the pivot opening. When the pivot bearing assembly is inserted into the pivot opening, therefore, the pivot bearing assembly can be brought into abutment, with no obstruction, against the pivot opening of the second hole diameter provided in the second actuator arm made of conductive material. Electric continuity can therefore be obtained even if an outer periphery of the pivot bearing assembly and an inner periphery of the pivot opening are bonded together with a nonconductive adhesive. Further, when the pivot bearing assembly is inserted into the pivot opening in the carriage, the pivot bearing assembly abuts against the step formed in the pivot opening. This step can therefore be used for a positioning reference in a height direction. Accurate positioning in the height direction can therefore be made without the use of any positioning jig.

A rotating disk storage device according to a third embodiment of the present invention includes a rotating disk recording medium, a first head suspension assembly, a second head suspension assembly, a first actuator arm, a second actuator arm, and a carriage. Each of the first head suspension assembly and the second head suspension assembly is mounted with a head that reads data from the rotating disk recording medium. The first head suspension assembly is secured to the first actuator arm. The first actuator arm includes a pivot opening having a first hole diameter, into which a pivot bearing assembly is inserted. A plurality of protruded portions that abut on the pivot bearing assembly are provided on a circumference of the pivot opening. The first actuator arm is made of a conductive material. The second head suspension assembly is secured to the second actuator arm. Further, the second actuator arm includes a pivot opening, into which the pivot bearing assembly is inserted and which has a second hole diameter that is smaller than the first hole diameter. The second actuator arm is also made of a conductive material. The first actuator arm and the second actuator arm are secured to the carriage through insert molding. The carriage includes a pivot opening having a first hole diameter and a second hole diameter. The carriage is made of a plastic resin.

The rotating disk storage device according to the third embodiment of the present invention can provide the effects of those according to the first and the second embodiments mentioned above.

If two or more actuator arms are provided in each of the above-mentioned embodiments of the present invention, the first actuator arm and the second actuator arm may preferably be connected together at a connection to be formed into a flat actuator arm unit. Further, the connection is preferably folded at two locations so that the first actuator arm and the second actuator arm are positioned at predetermined intervals provided therebetween, thereby making the center of the two pivot openings concentric with each other.

Such an arrangement as that described above allows two or more actuator arms to be formed into a single actuator arm unit. This permits an arrangement with a reduced number of components used in the carriage arm.

The present invention can provide a rotating disk storage device that has the following structure. Specifically, the structure can achieve a clean air environment in the HDA without allowing any flash to be left in the pivot opening when the actuator arm and the carriage are insert-molded using a plastic mold, while establishing electric continuity across the pivot opening in the carriage and the pivot bearing assembly.

Further, the present invention can provide a rotating disk storage device that has the following structure. Specifically, the structure allows the carriage with the actuator secured thereinto and a rotating disk recording medium to be accurately positioned relative to each other without using any positioning jig when the carriage with the actuator secured thereinto is assembled to a rotating disk storage device such as a magnetic disk drive or the like, while establishing electric continuity across the pivot opening in the carriage and the pivot bearing assembly.

DETAILED DESCRIPTION OF THE INVENTION

Figure 1:
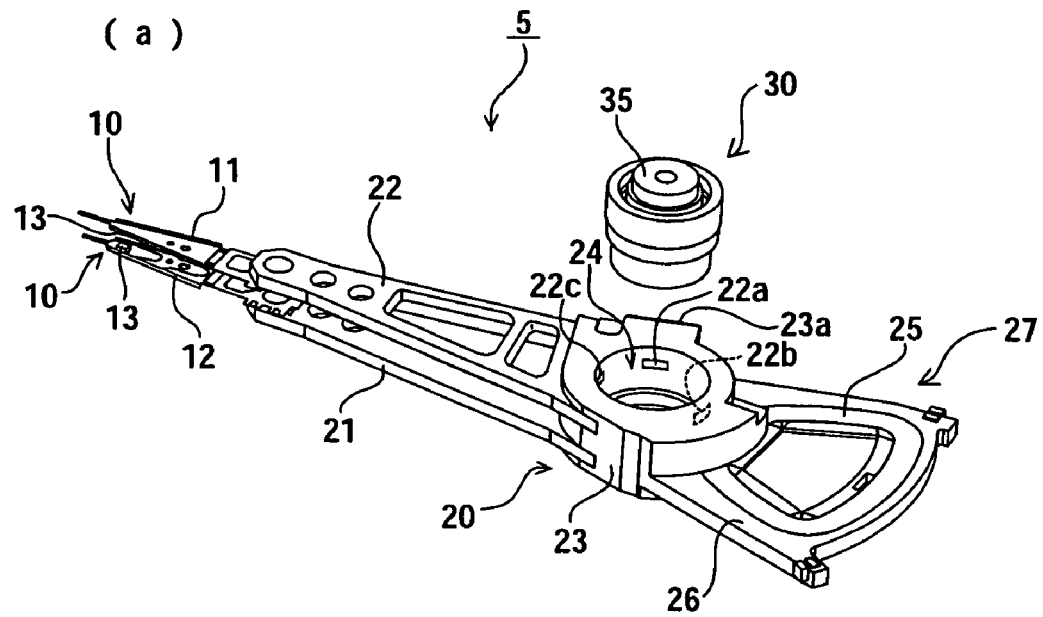
FIGS. 1(a) and 1(b) are views showing a principal portion of a magnetic disk drive according to an embodiment of the present invention.
Figure 1:
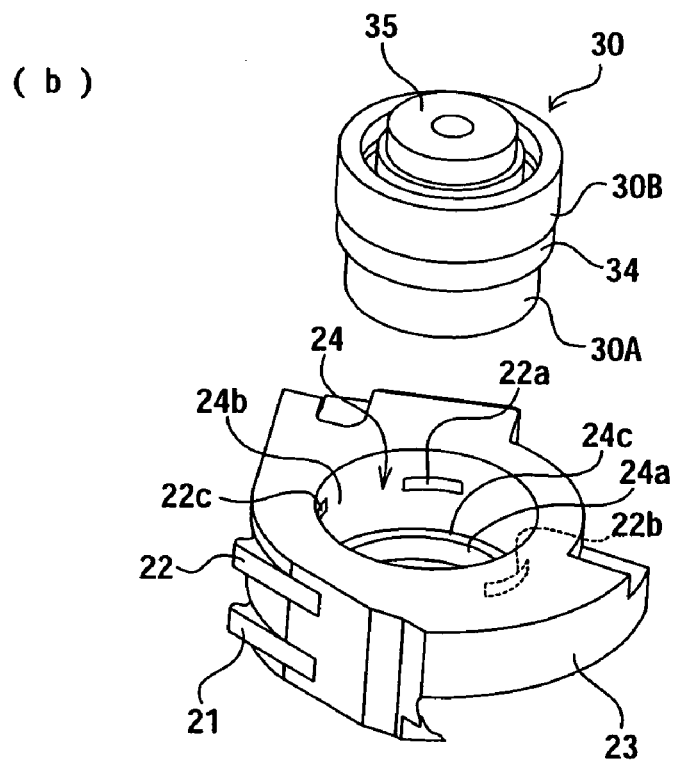
Figure 2:
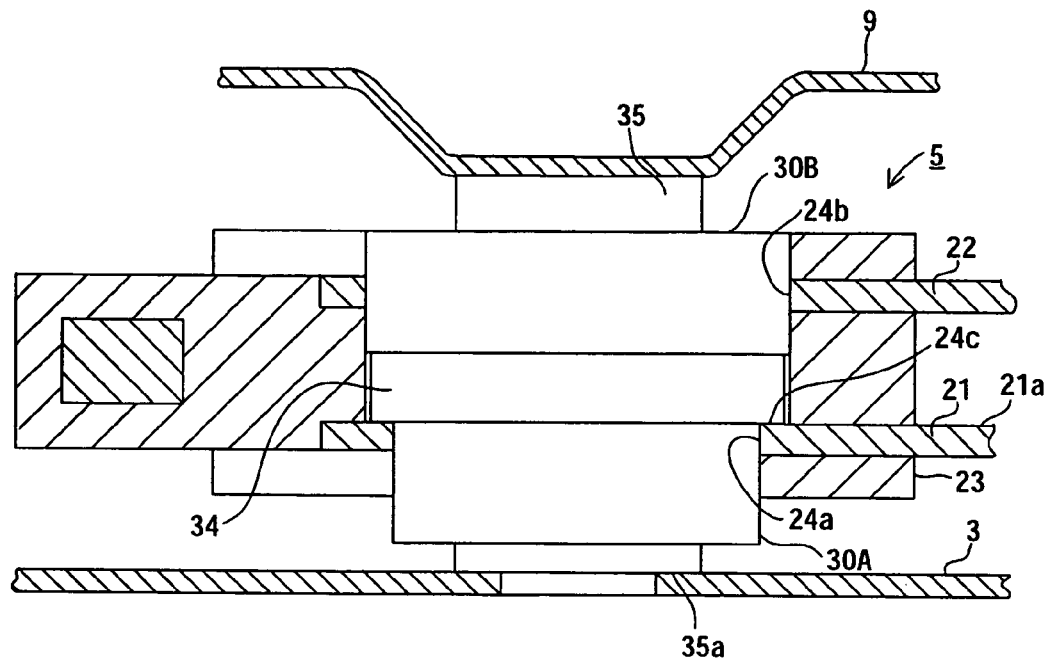
FIG. 2 is a partly sectional view showing a principal portion of a rotating disk storage device according to an embodiment of the present invention.
Figure 3:
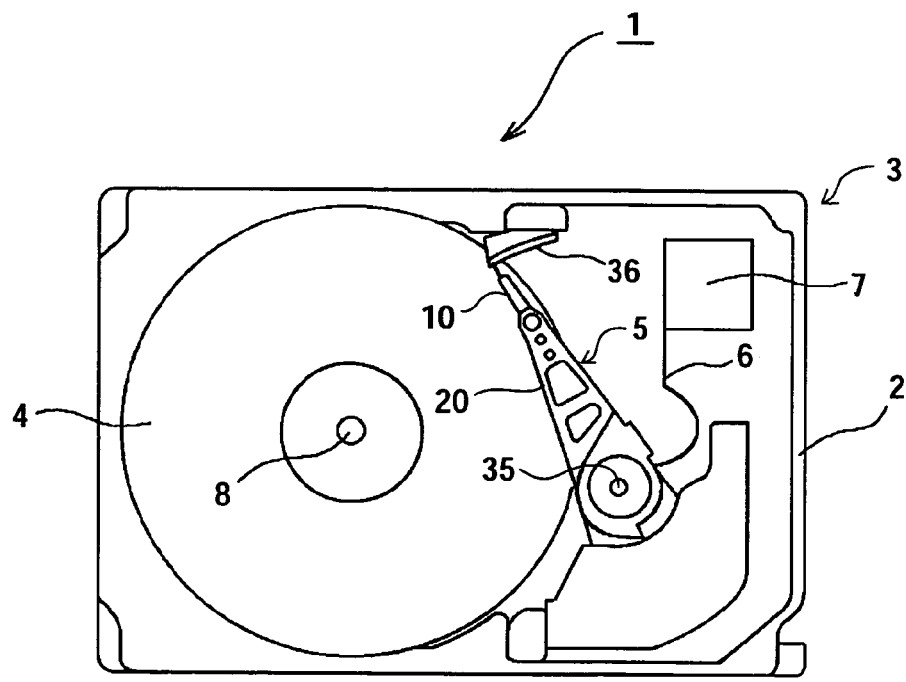
FIG. 3 is a plan view showing schematically the construction of the magnetic disk drive according to an embodiment of the present invention.
Figure 4:
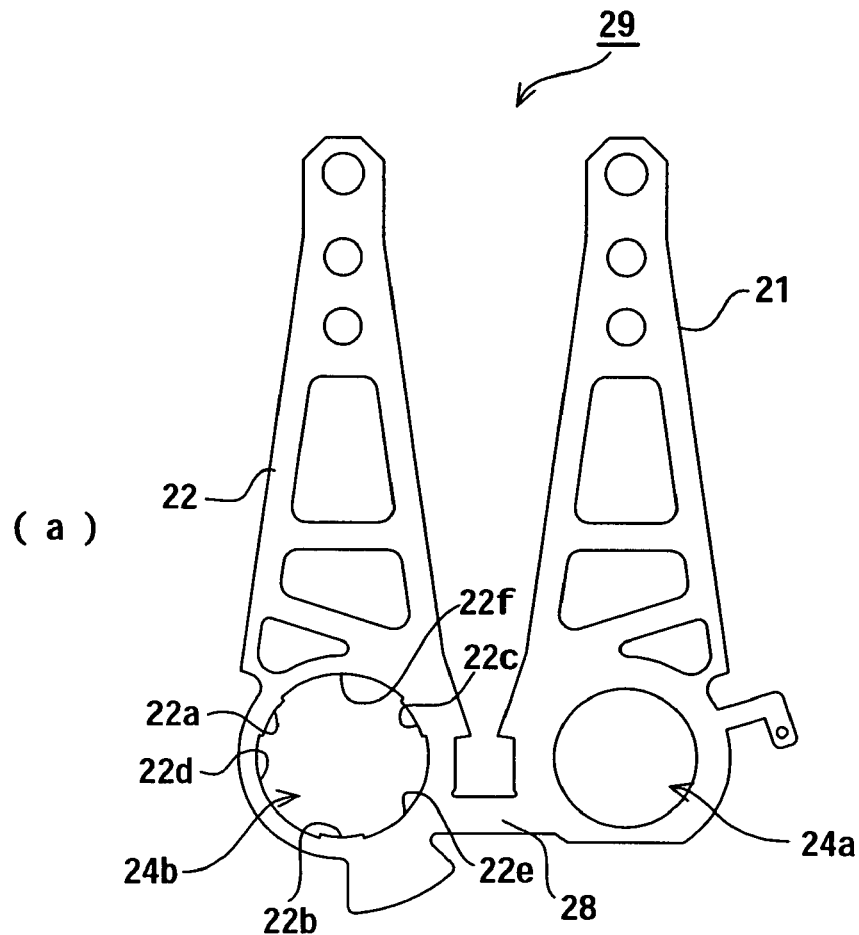
FIGS. 4(a) and 4(b) are views showing an actuator arm that forms part of a carriage arm that forms a principal component of a rotating disk storage device according to an embodiment of the present invention.
Figure 4:
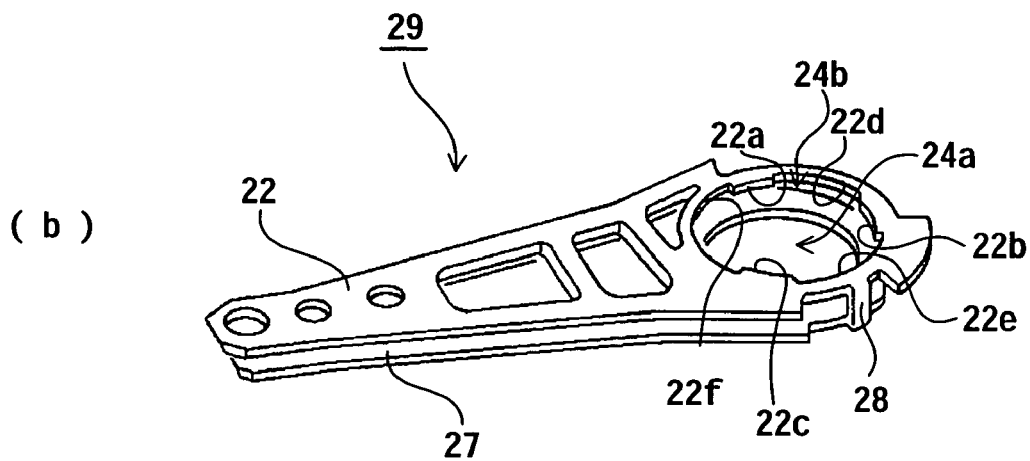

A rotating disk storage device according to specific embodiments of the present invention will be described with reference to the accompanying drawings. FIGS. 1(a) and 1(b) are views showing a principal portion of a magnetic disk drive according to one aspect of the present invention. FIGS. 1(a) and 1(b) represent a relationship between a carriage arm and a pivot bearing assembly. FIG. 1(a) is an overall perspective view and FIG. 1(b) is a partial perspective view. FIG. 2 is a partly sectional view showing the relationship between the carriage arm and the pivot bearing assembly shown in FIGS. 1(a) and 1(b). FIG. 3 is a plan view schematically showing the construction of the magnetic disk drive according to one embodiment of the present invention. FIGS. 4(a) and 4(b) are views showing an actuator arm that forms part of the carriage arm shown in FIGS. 1(a) and 1(b). FIG. 4(a) is an exploded view and FIG. 4(b) is a perspective view showing the actuator arm after folded to a predetermined shape.

The magnetic disk drive as the rotating disk storage device as a specific embodiment of the present invention is the HDA constructed as shown in FIG. 3. Specifically, the HDA includes a magnetic disk stack 4 serving as a rotating disk recording medium, a spindle motor (not shown), and an AHSA 5 housed in a disk enclosure 3 formed as an enclosed space by a base 2 and a cover (not shown) for covering an upper portion of the base 2. A flexible cable 6 and an external connection terminal 7 mounted thereon are built into the base 2. The external connection terminal 7 is connected to a circuit board (not shown) provided externally on the disk enclosure 3.

The magnetic disk stack 4 is a single disk, or two or more disks, secured to an outer periphery of a spindle 8 of a spindle motor arranged in a standing condition in the base 2. A recording surface is formed on a front side and a backside of the disk. Multiple disks are mounted in a laminated fashion to a spindle hub (not shown) with a predetermined distance between each pair of the multiple disks so that the disks can spin as an integrated body about the spindle 8.

The AHSA 5 includes two HSAs 10 and two carriage arms 20. Referring to FIG. 1(a), the HSA 10 includes a load beam 11 and a flexure 12. The flexure 12 supports a slider 13, to which a head is mounted. The slider 13 receives a lifting force produced by an air flow from a front surface of the magnetic disk stack 4, flying while maintaining a predetermined gap. The head may read and write data, or performs only a single task of reading or writing data.

The carriage arm 20 is constructed, for example, as shown in FIG. 1(a). Specifically, the carriage arm 20 includes two actuator arms 21, 22 and a carriage 23. The actuator arms 21, 22 support the HSA 10 on respective leading ends thereof. The two actuator arms 21, 22 are secured in a laminated fashion to the carriage 23 so that a predetermined amount of gap is provided between the two actuator arms 21, 22. The carriage 23 serves as a bearing portion for a pivot 35 fixed at a predetermined position in the base 2. A circularly shaped pivot opening 24 is formed at a front portion of the carriage 23. A pivot bearing assembly 30 pivotably mounted in the pivot 35 is inserted into the circular pivot opening 24. A coil support 26 for supporting a voice coil 25 is formed in a rear of the carriage 23. The coil support 26 and the voice coil 25 form, together with an upper yoke and a lower yoke (not shown), a VCM 27.

Referring to FIG. 1(b), two holes 24a, 24b having different hole diameters from each other are formed in the pivot opening 24 of the carriage 23 so as to form a step 24c at an adjoining portion of the two holes.

The pivot bearing assembly 30 inserted in the pivot opening 24 includes the following components. Specifically, referring to FIG. 1(b), the components include a first roller ball bearing 30A and a second roller ball bearing 30B. The first and the second roller ball bearings 30A, 30B include an outer race and an inner race with a plurality of balls as rolling elements interposed therebetween. The first roller ball bearing 30A is formed by the outer race of an outside diameter such as to be an interference fit or a clearance fit on the hole 24a having a smaller hole diameter in the pivot opening 24. The second roller ball bearing 30B is formed by the outer race of an outside diameter such as to be an interference fit or a clearance fit on the hole 24b having a larger hole diameter in the pivot opening 24. The inner races of the first and the second roller ball bearings 30A, 30B are of the same inner diameter. This allows the inner races to be an interference fit or a clearance fit on the pivot 35 having a straight shape. The first and the second roller ball bearings 30A, 30B are fitted over the pivot 35 so as to be disposed in tandem. There is interposed a spacer 34 of a cylindrical shape between the first and the second roller ball bearings 30A, 30B.

The carriage arm 20 with the pivot bearing assembly 30 mounted in the pivot opening 24 is formed as follows for a reduced weight and a lower cost. Specifically, the two actuator arms 21, 22 are made of a conductive material, such as aluminum, stainless steel, or the like. The carriage 23 is formed by a plastic resin, such as liquid crystal polymer (LCP), polyphenylene sulfide (PPS), or the like.

As noted earlier, the carriage 23 is provided with two holes. Referring to FIGS. 1(b) and 2, the hole 24a having the smaller hole diameter is provided in the actuator arm 21 located on the lower side (on the side of the base 2). The top surface of the actuator arm 21 serves as the step 24c. The hole 24b having the larger hole diameter is provided in the actuator arm 22 located on the upper side. Referring to FIGS. 4(a) and 4(b), arcuate protruded portions 22a, 22b, 22c are formed at three locations on a peripheral wall serving as an inner surface of the hole 24b having the larger hole diameter of the actuator arm 22. The arcuate protruded portions 22a, 22b, 22c can abut against the second roller ball bearing 30B of the pivot bearing assembly 30. The arcuate protruded portions 22a, 22b, 22c are equally spaced. This means that there are formed arcuate recessed portions 22d, 22e, 22f at three locations, equally spaced, between each pair of the protruded portions 22a, 22b, 22c. Each of these arcuate recessed portions 22d, 22e, 22f is given a clearance from the second roller ball bearing 30B of the pivot bearing assembly 30. The inner surface of the hole 24a having the smaller hole diameter in the actuator arm 21 is smooth with no protruded portions formed thereon.

Referring to FIGS. 4(a) and 4(b), the two actuator arms 21, 22 form an actuator arm unit 29. The actuator arm unit 29 includes a connection 28 that connects a portion of the hole 24a in the actuator arm 21 with a portion of the hole 24b in the other actuator arm 22. The actuator arm unit 29 is formed as follows. Specifically, a sheet of metal is blanked into a flat sheet through a shearing operation using a press (FIG. 4(a)); the connection 28 is then folded into substantially a U-shape through a bending operation at two places that serve as connection points with the actuator arms 21, 22, or the connection 28 is folded into a U-shape (FIG. 4(b)). When folded in the manner as described above, the actuator arm unit 29 is a structure, in which the two actuator arms 21, 22 are positioned opposingly and substantially in parallel with each other at predetermined spaced intervals. In addition, centers of the holes 24a, 24b in the two actuator arms 21, 22 are concentric in this condition. The portion folded in the connection 28 should preferably be formed to have a thin wall so that the portion can be easily folded during the bending operation performed using the press. The shape of the fold made at the connection 28 is not limited to a U. Rather, any other shape may be used as long as it is good for manufacturing.

To manufacture the carriage arm 20 that can be formed using a reduced number of components as described in the foregoing, a plastic mold for insert molding (not shown) is used. The outline of a mold insert pin for placing the press-worked actuator arm unit 29 in a desired position within the mold is formed to have substantially the same shape as that of the pivot bearing assembly 30. When the actuator arm unit 29 is insert-molded using this plastic mold, the protruded portions 22a, 22b, 22c provided in the hole 24b functioning as the pivot opening in the actuator arm 22 abut on the insert pin of the plastic mold with no clearance therebetween. The recessed portions 22d, 22e, 22f are disposed within the mold to have a clearance from the mold insert pin. The hole 24a functioning as the pivot opening in the actuator arm 21 is placed within the mold so as to abut on the insert pin of the plastic mold. In a conventional arrangement, in which the hole 24b in the actuator arm 22 abuts on the insert pin of the mold throughout an entire periphery thereof, the hole 24b in the actuator arm 22 has a clearance from the mold insert pin produced due to a machining error or other factor. In accordance with the embodiment of the present invention, however, the protruded portions 22a, 22b, 22c are spaced by recessed portions 22d, 22e, 22f. The clearance produced between the recessed portions 22d, 22e, 22f and the insert pin of the mold allows the actuator arm 22 to be moved over a predetermined amount relative to the insert pin of the mold. The position of the actuator arm 22 can therefore be adjusted relative to the insert pin of the mold. This allows the protruded portions 22a, 22b, and 22c to be abutted evenly against the insert pin of the mold. If insert molding is performed in the condition as noted above, the protruded portions 22a, 22b, 22c of the hole 24b in the actuator arm 22 abut on the insert pin of the mold with no clearance therebetween. This prevents molten resin from sneaking into the clearance otherwise produced. The recessed portions 22d, 22e, 22f of the hole 24b in the actuator arm 22, on the other hand, have a clearance relative to the insert pin of the mold. An arcuate plastic resin that can abut on the second roller ball bearing 30B of the pivot bearing assembly 30 with no clearance therebetween is formed in that portion to have a predetermined thickness in a peripheral direction. This eliminates flash otherwise left on the pivot opening 24 in the carriage 23. A clean air environment can therefore be maintained in the HDA.

There is no chance of molten resin entering a gap between the hole 24a in the actuator arm 21 and the mold pin for plugging up the hole 24a. This is because the insert pin of the mold is made to be in abutment against a portion of the step 24c during insert molding so as to produce the step 24c at the location of the hole 24a in the actuator arm 21. The molten resin is thereby prevented from entering the gap at the step 24c. This causes the molten resin to flow to the location of the hole 24a in the actuator arm 21 from one surface only relative thereto. Should there be the clearance as described in the Brief Summary of the Invention between the hole 24a in the actuator arm 21 and the insert pin of the mold, therefore, the molten resin can never sneak thereto. On the other hand, the molten resin flows from both surfaces to the location of the hole 24b in the actuator arm 22. A greater amount of molten resin therefore flows per unit area at the location of the hole 24b in the actuator arm 22 than at the location of the hole 24a in the actuator arm 21. Should there be the clearance as described in [Problem to be Solved by the Invention] between the hole 24b in the actuator arm 22 and the insert pin of the mold, therefore, the molten resin tends to flow into the clearance.

The following will result, if the conductive actuator arm 21 located on the lower side (on the side of the base 2) of the carriage arm 20 functions as the step 24c in the pivot opening 24. Specifically, when the pivot bearing assembly 30, should it be formed by conductive components, is mounted in the pivot opening 24, the surface of the spacer 34 made of a conductive material, such as stainless steel or the like, abuts against the step 24c of the actuator arm 21. This positively establishes electric continuity across the actuator arm 21 located on the lower side and the pivot bearing assembly 30. In addition, the actuator arm 21 and the actuator arm 22 are connected together at the connection 28. The actuator arm 22 located on the upper side of the carriage arm 20 can therefore also establish electric continuity with the actuator arm 21 located on the lower side of the carriage arm 20. It may not be possible to establish electric continuity across the lower actuator arm 21 and the pivot bearing assembly 30. The upper actuator arm 22 can still establish electric continuity with the pivot bearing assembly 30 through the protruded portions 22a, 22b, 22c. Electric continuity can therefore be established across the lower actuator arm 21, which is connected to the upper actuator arm 22 through the connection 28, and the pivot bearing assembly 30. By establishing electric continuity across each of these circuits, static electricity can be prevented from being produced at the leading end of each HSA 10. If the electric continuity cannot be established across any of these circuits, the AHSA 5 tends to be charged. Then, a potential difference could be produced between the head of the HSA 10 or the actuator arms 21, 22 and the pivot bearing assembly 30.

The following are the reasons why the actuator arms 21, 22 should be electrically conductive relative to the base 2.

For one, a head ground terminal may be grounded by way of a head wire and FPC (flexible printed circuit) to the base 2; however, electric transmission signals are not stabilized unless the head ground terminal is connected to a ground point located as near as possible and having potential as stable as possible. In particular, noise could be produced if the transmission frequency becomes high. For another, the head wire must be grounded to the actuator arms 21, 22, since static electricity could be produced in the head wire during assembly of the AHSA, which could damage the head.

In addition, the electric continuity established across the step 24c of the carriage arm 20 and the pivot bearing assembly 30 permits the use of a low-cost, nonconductive adhesive used for the following purposes. The adhesive is specifically used for bonding between the hole 24a having the smaller hole diameter in the pivot opening 24 and the outer periphery of the outer race of the first roller ball bearing 30A of the pivot bearing assembly 30. The adhesive is also specifically used for bonding between the hole 24b having the larger hole diameter in the pivot opening 24 and the outer periphery of the outer race of the second roller ball bearing 30B of the pivot bearing assembly 30.

As a low-cost, nonconductive adhesive used for securing the pivot bearing assembly 30 in the pivot opening 24 in the carriage arm 20, use of the UV adhesive by the brand name of 326LVUV manufactured by LOCTITE in combination with the curing promoter by the brand name of LP-98B is recommended. Adding the curing promoter to the UV adhesive helps the UV adhesive cure. It might be noted that the UV adhesive by the brand name of 326LVUV can cure itself.

A magnetic disk drive 1 also includes a ramp 36 provided near the magnetic disk stack 4 (see FIG. 3). When the magnetic disk stack 4 is to be brought to a stop from spinning, the ramp 36 provides a merge lip (not shown) provided at a leading end of the HSA 10 with a sliding surface for retracting the head.

Before assembling the magnetic disk drive 1 having the arrangements as described in the foregoing, the carriage arm 20 is previously assembled by using the assembly procedures described in the foregoing.

To assemble the magnetic disk drive 1, the following steps are performed. Specifically, the spindle motor is assembled in an inside of the base 2 of the disk enclosure 3. The magnetic disk stack 4 is then screwed to a rotor of the spindle motor. The lower yoke is provided for the base 2.

The carriage arm 20 for supporting the HSA 10 at the leading end thereof is next mounted to the pivot 35. To perform this step, the pivot bearing assembly 30 is mounted in the pivot opening 24 in the carriage 23 forming the carriage arm 20. With the hole 24b having the larger hole diameter in the pivot opening 24 in the carriage 23 located on the upper side, a lower end portion of the pivot 35 of the pivot bearing assembly 30 is secured to a predetermined position in the base 2 using a screw or the like. The AHSA 5 is thus secured to the base 2. When the pivot bearing assembly 30 is inserted in the pivot opening 24 in the carriage 23, the spacer 34 is brought into abutment against the step 24c formed in the pivot opening 24. The step 24c then serves as the reference position for positioning the AHSA 5 in the height direction relative to the base 2. This allows for accurately positioning the AHSA 5 in the height direction without using any positioning jig when the AHSA 5 is assembled into the base 2. For example, as shown in FIG. 2, a lower end portion 35a of the pivot 35 to be in face contact with the base 2 and an upper surface 21a of the actuator arm 21 located on the lower side of the carriage arm 20 may be used as the reference surfaces for positioning.

The HSA 10 supported by the carriage arm 20 is pivotally moved about the pivot 35. The magnetic head mounted on the slider 13 is thereby moved to a corresponding magnetic disk in the magnetic disk stack 4. A magnetic head side end portion not shown of the flexible cable 6 is attached to a side surface 23a of the carriage 23 (see FIG. 1(a)). The head wire from the magnetic head and a coil wire from the voice coil 25 of the carriage 23 are connected, respectively, to the magnetic head side end portion. The other end portion of the flexible cable 6 is connected through a connector to the external connection terminal 7. One end of the head wire is connected to, and grounded through, the actuator arm. As described in the foregoing, electric continuity is established across the actuator arm and the pivot bearing assembly 30. The head is therefore grounded with respect to the base 2.

The following procedures are performed as the final steps. Specifically, the upper yoke is disposed upward the lower yoke. The rest of other necessary parts are assembled to the base 2. Referring now to FIG. 2, a cover 9 is attached to the base 2. An upper end portion of the pivot 35 of the pivot bearing assembly 30 is then secured to a predetermined position of the cover 9 using a screw or the like. This completes the assembly procedures. The pivot 35 is secured to the base 2 and the cover 9 of the disk enclosure 3. This prevents the pivot 35 from being tilted to adversely affect pivotal motion of the AHSA 5.

In the magnetic disk drive 1 in accordance with the embodiment of the present invention, as described the in the foregoing, the carriage arm 20 included in the AHSA 5 has the two actuator arms 21, 22 laminated together and secured with a predetermined gap provided therebetween. The invention is not limited to this configuration only. Rather, the carriage arm may have three or more actuator arms laminated together and secured with a predetermined gap provided therebetween, as long as the following condition is met. The condition is, specifically, that the pivot bearing assembly 30 can be mounted, with electric continuity established, in the pivot opening 24 provided in the carriage 23 so as to form the step 24c at the adjoining portion of the two holes 24a and 24b having different hole diameters from each other. In this case, each adjoining pair of the three or more actuator arms is connected at the connection.

In the magnetic disk drive 1 in accordance with the present embodiment, as described the in the foregoing, the protruded portions 22a, 22b, 22c and the recessed portions 22d, 22e, 22f are provided in the hole 24b in the actuator arm 22 of the two actuator arms 21, 22. The invention is not limited to this configuration only. Rather, the protruded portions 22a, 22b, 22c and the recessed portions 22d, 22e, 22f may be provided both of the two actuator arms 21, 22. In addition, in the magnetic disk drive 1 in accordance with the present embodiment, the protruded portions 22a, 22b, 22c provided at three locations in the hole 24b in the actuator arm 22 are equally spaced. The invention is not limited to this configuration only. Rather, any number of protruded portions may be placed at any intervals, as long as the protruded portions can be brought into even abutment against the insert pin of the mold.

Figure 5:
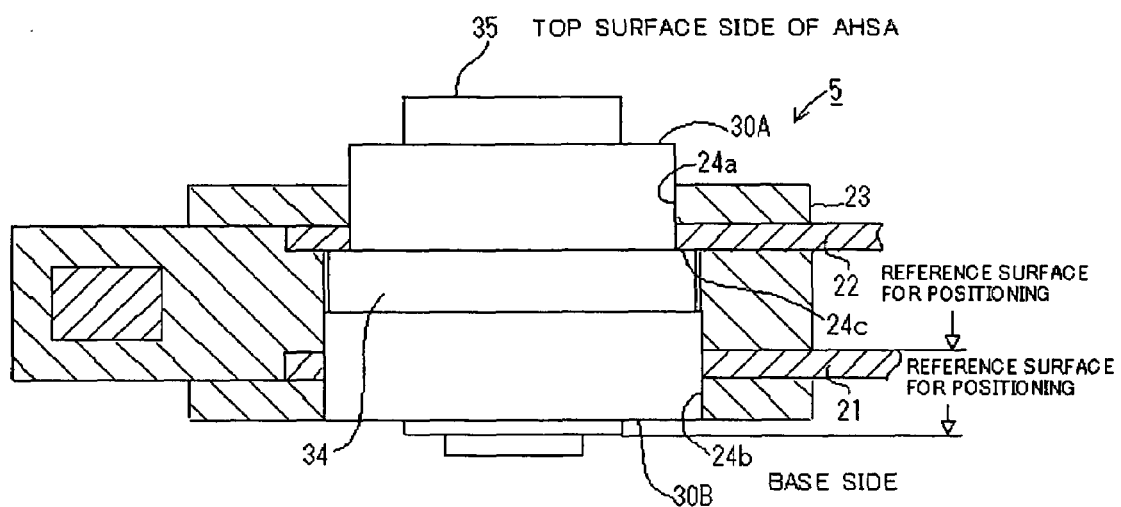
FIG. 5 is a partly sectional view showing a principal portion of a rotating disk storage device according to another embodiment of the present invention.

Further, in the magnetic disk drive 1 in accordance with the present embodiment, as described the in the foregoing, the hole 24a having the smaller hole diameter in the pivot opening 24 in the carriage 23 included in the carriage arm 20 is provided on the lower side (on the side of the base 2) of the carriage 23. The invention is not limited to this arrangement only. Rather, as shown in FIG. 5, the hole 24b having the larger hole diameter in the pivot opening 24 in the carriage 23 included in the carriage arm 20 may be provided on the lower side (on the side of the base 2) of the carriage 23. Even in this arrangement, the step 24c formed by the two holes 24a, 24b having different hole diameters from each other at the adjoining portion thereof can serve as the reference for positioning the AHSA 5 in the height direction relative to the base 2. This permits accurate positioning in the height direction without having to use any positioning jig. The top surface of the AHSA 5, as the term is used herein, refers to a portion positioned upward when the AHSA 5 is assembled into the base 2.

Further, in accordance with the present embodiment, the pivot opening 24 is formed circularly in the carriage 23 included in the carriage arm 20. The invention is not limited to this arrangement only. Rather, various other shapes may be adopted with respect to the pivot bearing assembly 30.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A rotating disk storage device comprising:
   a rotating disk recording medium;
   a head suspension assembly mounted with a head for reading data from the rotating disk recording medium;
   an actuator arm formed from a conductive material, the actuator arm supporting the head suspension assembly and having a first pivot opening in which a pivot bearing assembly is inserted, the first pivot opening being provided, on an inner surface thereof with a plurality of protruded portions to be brought into abutment against the pivot bearing assembly; and
   a carriage molded onto the actuator arm, the carriage having a second pivot opening also in which the pivot bearing assembly is inserted, wherein the carriage is made of a plastic resin.

2. The rotating disk storage device according to claim 1, wherein the first pivot opening is formed into a circular shape and the protruded portions are formed at three equally spaced locations on the inner surface of the first opening.

3. The rotating disk storage device according to claim 1, wherein the first pivot opening of the actuator arm includes another inner surface around an entire plane of the first pivot opening, wherein the entire other inner surface does not have protruded portions.

4. The rotating disk storage device according to claim 3, wherein electric continuity is established across the actuator arm including the inner surface with the protruded portions and the other inner surface without protruded portions.

5. A rotating disk storage device comprising:
   a rotating disk recording medium;
   a first head suspension assembly and a second head suspension assembly, each mounted with a head for reading data from the rotating disk recording medium;
   a first actuator arm formed from a conductive material, the first actuator arm securing the first head suspension assembly and having a first pivot opening with a first hole diameter in which a pivot bearing assembly is inserted;
   a second actuator arm formed from a conductive material, the second actuator arm being connected to the first actuator arm, securing the second head suspension assembly, and having a second pivot opening with a second hole diameter smaller than the first hole diameter, in which the pivot bearing assembly is inserted; and
   a carriage molded onto the first and second actuator arms and configured to secure the first actuator arm and the second actuator arm, wherein the carriage has a third pivot opening that has a first section with the first hole diameter and a second section with the second hole diameter and in which the pivot bearing assembly is inserted.

6. The rotating disk storage device according to claim 5, wherein an outer periphery of the pivot bearing assembly and an inner surface of the pivot openings are bonded with an adhesive.

7. The rotating disk storage device according to claim 6, wherein the adhesive is nonconductive.

8. The rotating disk storage device according to claim 5, wherein the first pivot opening of the first actuator arm includes a plurality of protruded portions to be in abutment against the pivot bearing assembly.

9. A rotating disk storage device comprising:
   a rotating disk recording medium;
   a head suspension assembly mounted with a head for reading data from the rotating disk recording medium; and
   an actuator arm unit formed from a conductive material, the actuator arm unit including a first actuator arm and a second actuator arm, each functioning to secure the head suspension assembly and including a pivot opening in which a pivot bearing assembly is inserted, and each being mutually connected at a connection, the connection being folded so as to position the first actuator arm and the second actuator arm with a predetermined distance away from each other, and to make the pivot opening in each of the two actuator arms concentric with each other, at least one of the pivot openings in the first and second actuator arms being provided, on an inner surface thereof, with a plurality of protruded portions to be brought into abutment against the pivot bearing assembly.

10. The rotating disk storage device according to claim 9, wherein the pivot opening is formed into a circular shape and the protruded portions are formed at three equally spaced locations on the inner surface of the opening.

11. The rotating disk storage device according to claim 9, wherein the pivot opening of the first actuator arm and the pivot opening of the second actuator arm have different sizes.

12. The rotating disk storage device according to claim 9, wherein an outer periphery of the pivot bearing assembly and an inner surface of the pivot opening are bonded with an adhesive.

13. A rotating disk storage device comprising:
a rotating disk recording medium;
a first head suspension assembly and a second head suspension assembly, each mounted with a head for reading data from the rotating disk recording medium;
a first actuator arm formed from a conductive material, the first actuator arm securing the first head suspension assembly and including a pivot opening with a first hole diameter in which a pivot bearing assembly is inserted, a plurality of protruded portions to be in abutment against the pivot bearing assembly being provided on an area surrounding the pivot opening;
a second actuator arm formed from a conductive material, the second actuator arm securing the second head suspension assembly and including a pivot opening with a second hole diameter smaller than the first hole diameter, in which the pivot bearing assembly is inserted; and
a carriage formed from a plastic resin to secure the first actuator arm and the second actuator arm through insert molding and including a pivot opening having the first hole diameter and the second hole diameter.

14. The rotating disk storage device according to claim 13, wherein the first actuator arm and the second actuator arm are mutually connected together at a connection to be formed as a flat actuator arm unit and the connection is folded at two locations so as to position the first actuator arm and the second actuator arm with a predetermined distance away from each other, and to make the pivot opening with the first hole diameter concentric with the pivot opening with the second hole diameter.

15. The rotating disk storage device according to claim 14, wherein the folded portions of the connection are formed to have a thinner wall than other portions of the actuator arms.

16. The rotating disk storage device according to claim 13, wherein the pivot opening is formed into a circular shape and the protruded portions are formed at three equally spaced locations on the inner surface of the opening.

17. The rotating disk storage device according to claim 13, wherein an outer periphery of the pivot bearing assembly and an inner surface of the pivot opening are bonded with an adhesive.

* * * * *